United States Patent Office 3,431,553
Patented Mar. 4, 1969

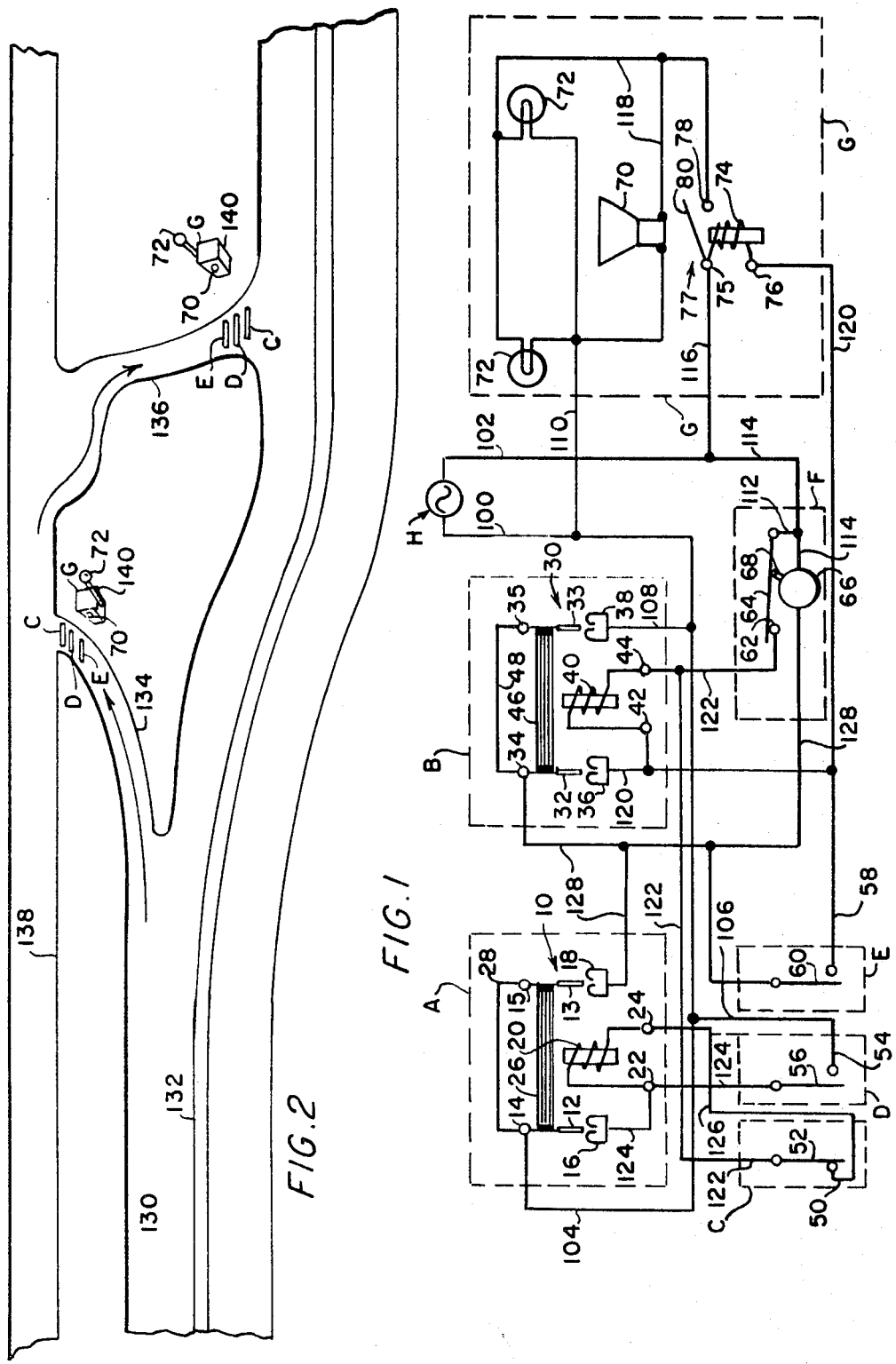

3,431,553
SIGNAL, ESPECIALLY FOR TRAFFIC AND
VEHICLE CONTROL
George Osmond, 25287 Delmar Ave.,
Hayward, Calif. 94542
Filed Oct. 22, 1965, Ser. No. 501,201
U.S. Cl. 340—31     5 Claims
Int. Cl. G08g 1/00; G08b 23/00

ABSTRACT OF THE DISCLOSURE

A signal which is responsive to movement of an object, e.g., an automobile in one direction, e.g., when entering a ramp for an express highway from the wrong direction, but not in the reverse direction, e.g., when leaving a ramp in the right direction, and a timing means for restoring the parts to the initial condition after a predetermined time following operation of the signal. The signal may include visible and/or audible means such as lights and a horn. The movement responsive means includes, in the case of a roadway signal, three roadway switches spaced a suitable distance apart and relays that connect the signal to the source of power when the switches are actuated by an automobile moving over the switches in the wrong direction for a predetermined time under control of the timing means, whereupon the circuit is broken to restore the parts to the initial condition ready for operation in the same way by another automobile moving over the switches in the wrong direction. Movement of the automobiles in the right direction does not connect the signal to the power source.

DESCRIPTION

The present invention relates to a signal which is responsive to movement of an object in one direction but not in the reverse direction and which therefore is adapted for use for traffic and vehicle control, e.g., at the entrance to an exit ramp from a limited access road or a one way street when the driver of a vehicle is going in the wrong direction.

In general the signal includes a power source, a signal device and a circuit comprising a plurality of switches, e.g., roadway switches that are actuated by a vehicle passing over them, adapted to be actuated in sequence and means operatively connecting said switches with the power source and the signal device in such a way that actuating the switches in one sequence connects the power source to the signal device while actuating them in the reverse sequence does not.

The best embodiment of the invention presently known is illustrated in the drawing, in conjunction with which the invention will be described, in which:

FIG. 1 is a schematic sketch of the elements of the invention and the circuit for them, and FIG. 2 is a diagram of a highway system including a limited acess highway, an access road, an exit ramp and an entrance ramp with the control installed in each ramp to warn drivers going into the ramp in the wrong direction.

Referring now to FIG. 1, the elements of the signal comprise a detector relay A, a logic relay B, a circuit clearance switch C, a detector circuit switch D, a logic circuit switch E, a timer F and a signal device G.

The detector relay includes a switch 10 of the double pole single throw type. In the embodiment shown this switch is illustrated as a knife switch but it will be understood that any suitable switch which functions in the same way may be used and the switch per se forms no part of the present invention. The switch comprises knives 12 and 13 pivoted or otherwise movably mounted in terminals 14 and 15, a spring grip 16 for knife 12, a spring grip 18 for knife 13, a solenoid 20 having terminals 22 and 24, an armature 26 secured to but insulated from knives 12 and 13 so as to close them into the spring grips 16 and 18 when the solenoid is energized and to open them from the said grips automatically, e.g., by spring action, when the solenoid is deenergized. Terminals 14 and 15 are electrically connected by a conductor 28.

The logic relay B is constructed like relay A, comprising a switch 20 having knives 32, 33, terminals 34, 35, spring grips 36, 38, a solenoid 40 with terminals 42, 44, an armature 46 and a conductor 48 electrically connecting terminals 34, 35.

Circuit clearance switch C is normally closed and it includes a fixed contact 50 and a movable contact 52.

Detector circuit switch D is normally open and it includes a fixed contact 54 and a movable contact 56.

Logic circuit switch E is also normally open and it includes a fixed contact 58 and a movable contact 60.

Timer F includes a switch having a fixed contact 62 and a movable contact 64 and means for opening the normally closed switch after passage of a predetermined time. Any suitable means may be employed for this purpose, e.g., a thermo-responsive element such as a bimetallic strip, a delayed-response relay, or the like, but it is preferred to use a motor driven actuator such as a Haydon timer having a motor and adjustable speed reducer illustrated by numeral 66 to drive an actuator 68 from a position away from the movable contact 64 to a position which disengages it from the fixed contact 62 after a predetermined, adjustable time. In any case the timer must permit the switch contacts 62 and 64 to reengage automatically after the circuit through them has been briefly interrupted by the actuator 68, and to return it to its initial, inactive position in readiness for the next operation.

The signal device G may be visual, audible or both, and in the embodiment illustrated it includes both a speaker or horn 70 and incandescent light bulbs 72. A relay to operate the signal device is included which comprises a solenoid 74 having terminals 75, 76, and a switch 77 having a fixed contact 78 and a movable contact and armature 80.

Power source H may be the available commercial alternating current, a storage battery or any other suitable source of electric current. It has been illustrated schematically as an alternating current generator. In any case the source will include two leads 100 and 102.

The means operatively connecting the switches C, D and E with the power source H and the signal device G includes the following conductors:

Conductor 104 connecting lead 100 to terminal 14 of A.

Conductor 106 connecting lead 100 to fixed contact 54 of D.

Conductor 108 connecting lead 100 to spring grip 38 of B.

Conductor 110 connecting lead 100 to one terminal of speaker or horn 70 and of lamps 72.

Conductor 112 connecting lead 102 to movable contact 64 of F.

Conductor 114 connecting lead 102 to one terminal of motor 66.

Conductor 116 connecting lead 102 to terminal 75 of solenoid 74 and to movable contact 80 of switch 77.

Conductor 118 which connects fixed contact 78 of switch 77 with the other terminal of speaker or horn 70 and the other terminals of lamps 72. It will be apparent that when solenoid 74 brings movable contact 80 into engagement with fixed contact 78 it completes the circuit from 100 and 102 through the speaker or horn 70 to produce an audible sound and through lamps 72 to produce a visible signal.

Conductor 120 which connects the other terminal 76 of solenoid 74 with fixed contact 58 of E, spring grip 36 of B and terminal 42 of solenoid 40 of B.

Conductor 122 which connects fixed contact 62 of F with terminal 44 of solenoid 40 of B and with movable contact 52 of C.

Conductor 124 which connects spring grip 16 of A with terminal 22 of solenoid 20 of A and with movable contact 56 of D.

Conductor 126 which connects terminal 24 of solenoid 20 of A with fixed contact 50 of C.

Conductor 128 which connects spring grip 18 of A with terminal 34 of B, with movable contact 60 of E and with the other terminal of motor 66 of F.

The operation will be explained in conjunction with FIG. 2 in which 130 represents a limited access highway having a center divider or mall 132, an exit ramp 134 from the highway 130 and an entrance ramp 136 to the highway 130 from an access road or street 138. Near the end of the exit ramp 134 where vehicles leaving the limited access highway 130 emerge into access road 138, and where a vehicle on road 138 could enter, three roadway switches are embedded in the ramp. These switches C, D and E correspond to those in FIG. 1 and it will be seen that the sequence of closing for vehicles going in the right direction from the limited access highway 130 into the access road 138 is E, D, C whereas for a vehicle entering the wrong way it is C, D, E.

Similarly in the ramp 136 near the exit end where vehicles from the access road 138 ar eabout to enter the limited access highway 130 three roadway switches C, D and E are embedded in the ramp. Here again the sequence of closing the switches by vehicles going in the correct direction is E, D, C whereas a vehicle attempting to leave the limited access highway 138 by ramp 136 would cause them to close in the sequence C, D, E.

Adjacent to each of the ramps in the vicinity of the roadway switches is a standard 140 for holding the speaker or horn 70 and one or more lamps 72 so that the vehicle entering the ramp in the wrong direction will energize the signal and give warning to the driver thereof. At the same time a driver entering the ramp in the right direction would hear the horn and/or see the light and know that there is danger ahead. If the ramp is long enough to make it doubtful that both drivers would be warned from a single signal device G, two of them may be used in parallel, one adjacent to one end of the ramp and the other adjacent to the other end.

Referring now again to FIG. 1, closing the switch E while D is open and C is closed has no effect. Closing switch D while E is open and C is closed operates relay A, closing switch 10 but this does not energize the signal device G because logic relay B is open. Relay A is self-energizing once it has been closed because current from lead 100 flows through connector 104, knife 12, spring grip 16, conductor 124, solenoid 20, conductor 126, switch C which is normally closed, conductor 122, contacts 62, 64 and conductor 112 to lead 102. However as soon as switch C is opened the circuit to solenoid 20 is opened also, thus deenergizing it and permitting switch 10 automatically to open. Then when switch C closes again all parts are in their initial position once more. At the same time that switch 10 of A is closed, current is impressed across motor 66 through knife 13, conductor 28 leading thereto from 14 which is connected by 104 to lead 100, spring grip 18, conductor 128, motor 66, conductor 114 which is connected to lead 102. This starts the timer operating but in genaral switch C is operated by the moving vehicle before the motor moves actuator 68 into contact with movable contact 64. When the circuit is broken by switch C, or if delayed by switch 62–64, the actuator is automatically returned to its initial position. Closing switch 10 also puts current to movable contact 60 of switch E and to terminals 34 and 35 of relay B but since E and 30 are open nothing happens in this sequence of operation but closing of relay A conditions B for response. Thus B is a logic relay of the AND type, i.e., it operates only in conjunction with a closed detector relay A. It will thus be seen that a vehicle moving in the correct direction on the ramp causes no signal to be given.

Now assume that a vehicle erroneously enters a ramp from the wrong direction. This will cause the switches to be actuated in sequence C, D, E. Actuating C, i.e., opening it has no effect. It is spaced from D a distance sufficient that the tire of a vehicle rolling over the roadway switch is clear of C before it engages D, and a distance of about two (2) feet is about the minimum that should be used in practice for roadway traffic control between C and D as well as between D and E. Now when D is closed the circuits described above are established, i.e., A is closed and both movable contact 60 of E and knives 32 and 33 of relay B are connected to lead 100. Next when E is closed current from 100 flows through conductor 120, terminal 42, solenoid 40, terminal 44, conductor 122, contacts 62 and 64 and conductor 112 to lead 102. This closes switch 30 which has two effects. One effect is to make B self-energizing by putting it across leads 100 and 102 through conductor 112, contacts 62 and 64, conductor 122, terminal 44, solenoid 40, terminal 42, conductor 120, spring grip 36, knife 32, conductor 48, knife 33, spring grip 38, and conductor 108 which connects to lead 100. This connection can only be broken by timer switch 62–64. The second effect is to energize relay 74. Terminal 75 thereof is connected by conductor 116 to lead 102. Terminal 76 becomes connected to lead 100 when 30 closes through 104, 14, 28, 15, 13, 128, 34, 32, 36, and 120. This causes movable contact 80 to engage fixed contact 78 and put both the horn 70 and the bulbs 72 across leads 100 and 102 through conductors 110, 118 and 116. This circuit also remains closed until it is broken by the actuator 68 of timer F lifting movable contact 64 free from fixed contact 62. Thus the rear wheel of vehicles which pass over C and D after they have been actuated by the front wheel, or the actuation of C and D by subsequent vehicles will not cause the signal circuit or the timer circuit to be opened because as long as switch 30 is closed the motor circuit is established from lead 100 through 108, 38, 33, 35, 48, 34, 128, 66, 114 and lead 102. However when timer F opens 64 and 62 the solenoid 40 is deenergized, permitting switch 30 automatically to open and restore B and F to initial condition. This also deenergizes relay 74 and opens the circuit through the horn and lamps.

It will thus be seen that the signal of the invention is well adapted to serve as a traffic control for vehicles on one way streets or ramps, permitting vehicles going in the correct direction to pass without activating a signal device but quickly giving an audible and/or visual signal to the driver of a vehicle entering a one way street or ramp from the wrong direction.

The invention is adapted for many uses other than traffic control of automobiles, e.g., for railroads to prevent a train from entering a siding through an erroneously opened switch, for coin collectors where switches C and D could be placed on the entrance side, the circuit to D to be broken by the proper coin and E on the exit side of the coin collector to close the circuit to the signal device if improper coins, or none, have been deposited.

Those skilled in the art will recognize that many other types of switches will operate in the invention in the same or equivalent way to those illustrated and described. For example, instead of roadway switches photoelectric cells could be used with equivalent results. Similarly the signal device could be a physical thing, such as a gate or the like that could be moved into the path of the moving thing going in the wrong direction. All such modifications and variations are contemplated by the invention and the terms switches, signal device, etc., are to be given the broadest construction consistent with the foregoing description and the prior art.

Having thus described and illustrated the invention, what is claimed is:

1. A signal including a power source, a signal device and a circuit comprising a plurality of switches adapted to be actuated in sequence, means operatively connecting said switches with the power source and signal device so that actuating the switches in one sequence connects the power source and signal device while actuating them in the reverse sequence does not, and circuit breaking means in addition to said switches for restoring the parts to initial condition following connection of the power source to the signal device.

2. A signal comprising:
   (I) as elements:
      (A) a detector relay,
      (B) a logic relay,
      (C) a circuit clearance switch,
      (D) a detector circuit switch,
      (E) a logic circuit switch,
      (F) a timer, and
      (G) a signal device,
   (II) a power source, and
   (III) a circuit connecting said elements and the power source so that actuating said switches in sequence E, D, C does not connect the signal device to said power source but actuating them in sequence C, D, E does for a predetermined time controlled by F.

3. A signal for warning drivers of vehicles entering a one way street or ramp from the wrong direction while permitting vehicles to flow in the right direction without warning which comprises:
   (I) a power source,
   (II) a signal device,
   (III) a circuit including as elements:
      (A) a detector relay,
      (B) a logic relay,
      (C) a normally closed circuit clearance roadway switch near the exit end of the one way street or ramp,
      (D) a normally open detector circuit roadway switch in the street or ramp adjacent to and inwardly from C,
      (E) a normally open logic circuit roadway switch in the street or ramp adjacent to and inwardly from D, and
      (F) a motor driven adjustable timer,
   with electrical connections so made that actuating the switches in sequence E, D, C does not connect I to II but actuating them in sequence C, D, E connects I to II for a predetermined time controlled by F.

4. A signal as set forth in claim 3 in which A is self-energizing to remain closed after D is actuated until C or F is actuated and B is self-energizing to remain closed after E has been actuated while A was closed until F is actuated.

5. A signal comprising switches C, D and E; a power source; a signal device; a detector relay, which is self-energizing after closing, electrically connected with switch D and the power source to be closed when D is actuated and to be opened when C is actuated after D; a logic relay, which is self-energizing after closing, electrically connected with switch E, the power source, the detector relay and the signal device, to be closed when E is actuated while the detector relay is closed but to have no effect when E is actuated while the detector relay is open; and a timer in the logic relay circuit to open the logic relay and deenergize the signal device after a predetermined time.

References Cited

UNITED STATES PATENTS 3,325,782   6/1967   Der _____ 340—31

THOMAS B. HABECKER, *Primary Examiner.*

U.S. Cl. X.R.

340—223, 322